July 25, 1961 C. BENNETT ET AL 2,994,027
POWER TRANSMISSION
Filed April 17, 1957
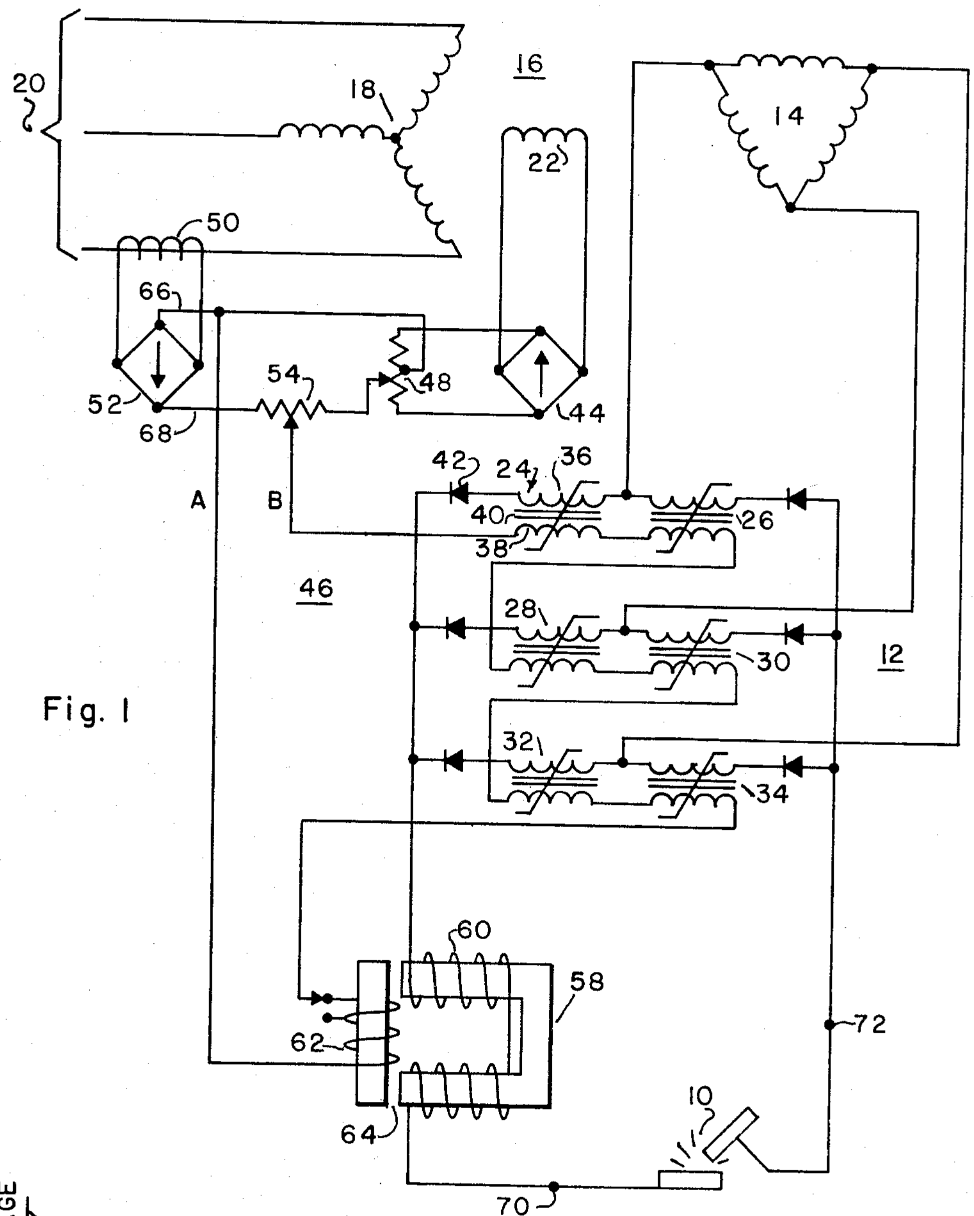
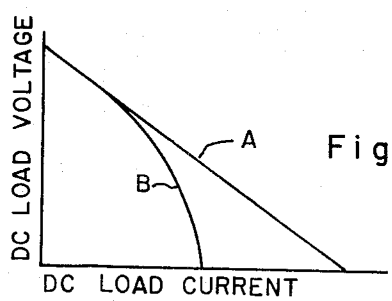
Fig. 2
INVENTORS
CLARENCE BENNETT
LESTER W. BUECHLER
BY
Clement J. Paznokas
ATTORNEY

United States Patent Office 2,994,027
Patented July 25, 1961

2,994,027

POWER TRANSMISSION

Clarence Bennett, Crestwood, and Lester W. Buechler, Kirkwood, Mo., assignors to Vickers Incorporated, Detroit, Mich., a corporation of Michigan

Filed Apr. 17, 1957, Ser. No. 653,465
20 Claims. (Cl. 321—18)

One form of D.C. power source for D.C. arc welding is the output of a saturable reactor-controlled dry-plate rectifier. D.C. welding, employing such a supply source and with certain types of electrodes, is subject to undesirable effects such as spatter and arc outages (popouts). One cause of spatter and popouts is the rapid change in the welding current due to rapid variations of the arc resistance resulting from, among other things, variations in arc length from one extreme to the other and bridging of the arc caused by globules of molten metal dropping from the welding rod into the weld crater. Variations in metal transfer at the welding arc cause pulsations in welding current and create instability when the welding current swings to its least value. Instability in welding means either temporary or permanent arc outage. A contributing factor toward popouts is deionization in the arc area as a result of the current minimum or troughs of the undulating D.C. current.

The above disadvantages may be substantially reduced or eliminated by the present invention. In accordance with one embodiment of the present invention, D.C. welding current from a reactor-controlled rectifier may be substantially stabilized, the wide current swings reduced, and a smooth, uniform, well-sustained arc may be provided by controlling the reactor with a signal from a rate transformer connected in the D.C. load line, the transformer being responsive to the rate of change of the D.C. welding current, and also having inherent inductance to delay incipient sudden changes in the D.C. welding current and thereby allow the rate signal to take control in time to smother or meet the sudden changes in welding current.

As a further feature of the invention the transformer may be constructed to saturate at higher values of welding current to compensate for the natural droop of the power supply at high current values, thereby tending to provide, under transient conditions, approximately the same percentage of current change in response to voltage changes through the operating voltage range. The saturating feature also prevents the loss of current peaks, which loss would other wise occur as a result of the down-driving signal from the rate transformer in response to increasing current.

A further aspect of the invention is an electrical mixing network whereby the rate signal is electrically mixed with another signal to supply a common control winding resulting in the elimination of extra reactors which would be required if a separate control winding would be used for the rate signal.

It is therefore an object of the present invention to provide improved D.C. current power supply apparatus.

Another object of the present invention is to reduce the wide swings in D.C. output current of a reactor-controlled rectifier when subjected to loads having wide variations or swings.

Another object of the present invention is to reduce the fluctuations and stabilize the D.C. welding current of a reactor-controlled rectifier D.C. welding apparatus.

Another object of the present invention is to provide a new and useful D.C. welder employing a reactor-controlled rectifier.

Further objects and advantages of the present invention will be apparent from the following description, reference being had to the accompanying drawing wherein a preferred form of the present invention is embodied in a D.C. arc welding circuit.

FIGURE 1 is a welding circuit in accordance with the present invention; and

FIGURE 2 shows the effect of feedback on the volt-ampere characteristics.

Referring now to the drawing, arc welding electrodes 10 are shown connected to a load circuit supplied with direct current from the D.C. output terminals of a polyphase rectifier 12. The particular rectifier shown is a three-phase full-wave bridge type connected to a delta secondary 14 of a three-phase transformer 16 having a Y primary 18 connected to a three-phase A.C. source 20, and also having a single-phase secondary 22. The core of transformer 16 is not shown.

A.C. energy supplied to the rectifier is controlled by saturable reactors 24, 26, 28, 30, 32 and 34, each having a power winding 36 and a control winding 38 inductively related to a saturable magnetic core 40. Each of the rectifier arms has connected therein, in series with a half-wave rectifier 42, a power winding 36 of one of the reactors, thus forming the well-known self-saturating reactor or magnetic amplifier circuit. Design considerations of components of self-saturating reactor circuits are well known and need no elaboration here. All the control windings 38 of the respective reactors are connected in series to effect common control in the same direction for all the reactors in response to a given signal. As is well known, the function of the control windings is to control the impedance of the reactors and consequently the output of the reactors and of the rectifier.

Ways and means for combining a plurality of reactors on a common core and the use of one common control winding for a plurality of reactors are well known in the art, and such means may of course be employed if desired in any circuit embodying the invention. Likewise, there are other well-known forms of saturable reactor-controlled rectifier circuits, for example reactor-controlled center tapped rectifiers, self-saturating double reactor circuit plus a bridge rectifier, and others, which could be used if desired in practicing the invention.

A bias or reference signal for establishing a reference point for the regulating action may be supplied to a control winding on the reactors from any suitable source, for example the D.C. output of a rectifier 44 connected to the single-phase secondary 22 of transformer 16. While the bias signal may be supplied directly to a separate bias winding on the reactors, in the example shown it is furnished to the common control winding 38 through an electrical mixing network 46. The output of rectifier 44 is connected into the mixing circuit through a potentiometer 48, which may be adjusted to provide bias signals of either polarity as might be necessary to establish the desired operating point. The D.C. output volt-ampere characteristic of the apparatus and the welding current level may be changed as desired by adjusting the potentiometer 48 and changing the reference signal. The volt-ampere characteristic is the potential vs. current curve of the D.C. output, with terminal voltage plotted as the ordinates (along the Y-axis) and welding current as the abscissae (along the X-axis). Without any feedback, it may be termed the virgin volt-ampere characteristic. In the drawing the potentiometer 48 is shown adjusted to provide positive bias to the reactors.

In order to reduce the slope of the volt-ampere characteristic and make the v.-a. curve more vertical within the welding voltage range, that is to provide smaller load current changes relative to output voltage changes, feedback current proportional either to load current or to load voltage may be supplied either to separate control windings on the reactors or to the common control windings 38, so that the impedance of the reactors may be changed to decrease the D.C. output of the rectifier 12 in response to increase of load current. Feedback control current proportional to the load current may be obtained in any suitable manner, for example the current transformer 50 (core not shown) with a primary in series with one of the phase conductors on the input side of transformer 16. The secondary of the transformer is connected to the input of a rectifier 52, whose output is connected through a potentiometer 54 and the network 46 to the control windings 38. The rectifier 52 is poled to supply current to the windings 38 in a direction to increase the impedance of the reactors and decrease the output of rectifier 12 in response to increase of load current. In FIG. 2 curve A is an example of a virgin volt-ampere characteristic, while curve B is an example after feedback has been introduced to make the slope more vertical.

Although the latter control proportional to load current permits some regulation of the output volt-ampere characteristic, the apparatus will not respond fast enough to the rapid variations of the ever present transients in arc welding loads so as to limit the resulting current swings, in order to prevent popouts, spattering and dangerous surges.

In the apparatus shown and in accordance with principles of the invention, the wide current swings due to rapid variations of the load are substantially reduced or eliminated by a rate signal supplied either to separate control windings on the reactors or to the common control windings 38 aided by time constant provided in the D.C. load circuit. The rate signal tends to change the premagnetization of the reactors in accordance with the rate of change of load current, and its direction when welding current is decreasing is such that the impedance of the reactors is decreased and the output of rectifier 12 is increased. The rate signal is obtained from a rate transformer 58 having a primary 60 connected in series with the D.C. load circuit, and a tapped secondary 62 connected through network 48 to the control windings 38. The rate transformer is responsive to the rate of change of welding current.

The usual rate transformer has virtually no inductance and is not intended to add inductance in a circuit. However, the rate transformer 58 is deliberately designed to add appreciable inductance into the D.C. load circuit in order to add time constant and thus filtering action to aid the rate signal in "subduing" the load current swings. Sufficient inductance should be added to the D.C. load circuit to provide a time constant for the load circuit of not less than one-fifth of a cycle of the ripple frequency of the rectified A.C. at the output of rectifier 12.

It is desirable to limit the rate response on increasing load current in order to avoid the loss of desirable current peaks and to compensate for the natural droop of the power supply at high current values. This is accomplished in accordance with a further feature of the invention by designing the rate transformer 58 to saturate at current values above the current range at which popouts are likely to occur, thus to prevent rate transformation at these upper current values.

The following is a practical example of a rate transformer designed in accordance with principles of the invention as embodied in reactor-controlled rectifier D.C. welder circuit designed for 60 cycle power input to rectifier, 300 ampere load rating at 60% duty cycle, 360 cycle ripple in output, about 80 volts open circuit and welding voltage range about 10–40 volts, typical welding current 75 amperes. The rate transformer was designed with about .5 millihenries inductance in the primary. The primary consists of 32 turns of No. 4 square wire, and the secondary of 100 turns of No. 22 wire. The air gap core consisted of U and I laminations as shown in the drawing spaced by an air gap 64.

In this particular example the laminations were of low permeability silicon steel known as "Dynamo Special" in the trade. The width of the I, and of the legs and yoke of the U-laminations was 1½ inches. The outside length of the legs of the U were 6 inches and the length of the I was 4½ inches. The stack height was 2⅜ inches. Thus, the stack cross section was 1½ x 2⅜ inches. The air gap 64 was set to .040 inch to allow the core to saturate at approximately 100 to 150 amperes welding current. The effective resistance of the D.C. load circuit under welding conditions was about .25 ohms. The time constant of the D.C. load circuit was $$\frac{L}{R} \text{ or } \frac{.0005}{.25} = .002 \text{ second}$$

The windings on the rate transformer 58 as related to each other and the rest of the circuit are oriented to provide a rate signal which increases the rectifier output in response to decreasing welding current.

Although, as hereinbefore stated, the bias, feedback, and rate signals may be magnetically mixed, that is applied to the reactors through separate control windings, it is advantageous to mix the signals electrically by means of an electrical mixing network, for example the T-network shown at 46, which includes basically the control windings and the rate transformer secondary plus their lumped impedance as the leg of the T, and the resistance element of the potentiometer 54 as the crossbar of the T. To the T are added the output of rectifier 52, and the output of rectifier 44 as seen through potentiometer 48. The resultant signal, having the components of the bias, feedback, and rate signals, is fed to the common control windings 38 which through the resultant signal tend to respond to each of the signals in the directions and manner heretofore described.

It should be understood that wherever it is stated that the respective signals should be in a direction to change the reactor impedance and rectifier output in a certain manner, the signals may be directed to have these effects whether the respective signals are applied individually to a reactor through individual control windings on the reactor or through an electrical mixing network as a resultant signal to a common control winding such as the control windings 38 in the illustrated example, the resultant signal having as components the respective signals. In the example shown the resultant signal supplied to the control windings 38 has as components thereof the bias signal, the feedback signal, and the rate signal. Considering ideal circuits and components, the resultant signal supplied by the mixing network 46 provides the same magnetic effects in the reactors as the resultant magnetic effects that would be produced in the reactors if the respective signals were applied as separate currents to separate control windings on the reactors. As a practical matter the electrical mixing network is preferred because a faster response time can be attained with the lowest signal input power requirements by use of the mixing network 46 in that the largest reflected impedance to the control windings is obtained. The ratio of bias current to feedback current, and thus the slope of v.-a. characteristic may be adjusted by means of the adjustable tap on potentiometer 54. A further advantage of the particular mixing network 46 is that it provides a wide range of adjustment of load current output by means of potentiometer 48 for any given setting of potentiometer 54.

If the signals from the rate transformer, the rectifier 52, and the potentiometer 48, were supplied to separate control windings on the reactors 24—34, extra reactors to limit harmonics would in some case be required in the control circuits. By electrically mixing the rate signal with at least one of the other control signals, and using the resultant signal in a common control winding, the need of an extra reactor in the secondary side of the rate control circuit is eliminated. It appears that the rate transformer secondary in the mixing network provides sufficient impedance to effectively limit undesirable harmonics.

If it is desired to employ feedback proportional to load voltage instead of to load current, the feedback should be positive feedback, and to obtain this, conductors 66 and 68 instead of being connected to rectifier 52 may be respectively connected to points 70 and 72 across the load circuit. The voltage feedback signal should be poled so that it supplies a signal component through the mixing network to the reactor control windings in the direction which will increase the reactor impedance and decrease the output of rectifier 12 in response to decrease of load voltage that is when load current increases.

It will be appreciated that as is known in the art, the relations of the respective control windings 38 and the main windings 36 of the reactors are such as to tend to buck out in the control windings induced voltages of the fundamental frequency of the supply voltage.

The invention and the particular examples of circuitry and components will give a uniformly, smooth and stable arc, substantially eliminate wide D.C. load current swings, and generally prevent popouts, spatter and surges.

While the form of embodiment of the invention as herein disclosed constitutes a preferred form, it is to be understood that other forms might be adopted, all coming within the scope of the claims which follow.

What is claimed is as follows:

1. D.C. arc welding apparatus comprising an input for connection to an A.C. source, rectifier means connected to receive energy from said input, saturable reactor means for controlling the energy supplied to the rectifier means, a welding circuit connected to the D.C. output of said rectifier means, a rate circuit responsive to the rate of change of the welding current for changing the impedance of said reactor means to increase the rectifier output in response to decreasing welding current, and means providing substantial inductance in said welding circuit.

2. D.C. arc welding apparatus comprising an input for connection to an A.C. source, rectifier means connected to receive energy from said input, saturable reactor means for controlling the energy supplied to the rectifier means, a welding circuit connected to the D.C. output of said rectifier means, and a rate circuit including a rate transformer connected in said welding circuit and responsive to the rate of change of the welding current for changing the impedance of said reactor means to increase the rectifier output in response to the rate of change of decreasing welding current, said transformer having substantial inductance for filtering the welding current.

3. D.C. arc welding apparatus comprising an input for connection to an A.C. source, rectifier means connected to receive energy from said input, saturable reactor means for controlling the energy supplied to the rectifier means, a welding circuit connected to the D.C. output of said rectifier means, and a rate circuit including a rate transformer connected in said welding circuit and responsive to the rate of change of the welding current for changing the impedance of said reactor means to increase the rectifier output in response to decreasing welding current, said transformer having inductance for filtering the welding current, said transformer being adapted to magnetically saturate at all welding current values above a predetermined value lying within the welding current operating range of the apparatus.

4. D.C. arc welding apparatus comprising an input for connection to and A.C. source, rectifier means connected to receive energy from said input, saturable reactor means for controlling the energy supplied to the rectifier means, a welding circuit connected to the D.C. output of said rectifier means, means for obtaining a signal proportional to load current, means responsive to said signal for increasing the impedance of said reactor means upon increase of load current, a rate circuit including a rate transformer connected in series in said welding circuit and responsive to the rate of change of the welding current for decreasing the impedance of said reactor means in response to decreasing welding current, and means providing substantial inductance in said welding circuit.

5. D.C. arc welding apparatus comprising an input for connection to an A.C. source, rectifier means connected to receive energy from said input, saturable reactor means for controlling the energy supplied to the rectifier means, a welding circuit connected to the D.C. output of said rectifier means, means for obtaining a signal proportional to load current, means responsive to said signal for increasing the impedance of said reactor means upon increase of load current, a rate circuit including a rate transformer connected in series in said welding circuit and responsive to the rate of change of the welding current for decreasing the impedance of said reactor means in response to decreasing welding current, said transformer having substantial inductance for filtering the welding current.

6. In a D.C. arc welding apparatus wherein an A.C. energized saturable reactor controlled rectifier supplies D.C. to the welding load through a load circuit connecting the D.C. output of the rectifier to the welding load, the combination therewith of a rate transformer in series with said load circuit for providing a signal responsive to the rate of change of welding current, and means utilizing said signal for changing the impedance of the reactor to increase the rectifier output in response to decreasing welding current, said transformer having substantial inductance to provide a large enough time constant in the load circuit for filtering action.

7. In a D.C. arc welding apparatus wherein an A.C. energized saturable reactor controlled rectifier supplies D.C. to the welding load through a load circuit connecting the D.C. output of the rectifier to the welding load, and wherein current proportional to load current is used to control the impedance of the reactor, the combination therewith of a rate transformer in series with said load circuit for providing a signal responsive to the rate of change of welding current, and means utilizing said signal for changing the impedance of the reactor to increase the rectifier output in response to decreasing welding current, said transformer having inductance to provide a large enough time constant in the load circuit for filtering action, said welding circuit being subject to spatter or popouts in the welding current range below a certain current value, said transformer having a core which is adapted to be below saturation for said welding current range over which spatter or popouts are likely to occur, and to saturate at welding currents above said range.

8. D.C. power supply apparatus comprising an input for receiving A.C., rectifier means connected to receive energy from said input, saturable reactor means connected to control the energy supplied to the rectifier means from the input, a D.C. load circuit for connecting the D.C. output of the rectifier means to a load, means for deriving a first signal responsive to the rate of change of the D.C. load current, means for obtaining a bias signal, a network for electrically mixing said signals to obtain a resultant signal, means for controlling the impedance of said reactor means in response to said resultant signal, said first signal being in a direction to drive the rectifier output upward in response to decreasing load current.

9. D.C. power supply apparatus comprising an input for receiving A.C., rectifier means connected to receive energy from said input, saturable reactor means connected to control the energy supplied to the rectifier means from the input, a D.C. load circuit for connecting the D.C. output of the rectifier means to a load, means for deriving a first signal responsive to the rate of change of the D.C. load current, means for deriving a second signal proportional to load current, a network for electrically mixing said signals to obtain a resultant signal, means for controlling the impedance of said reactor means in response to said resultant signal, said first signal being in a direction to drive the rectifier output upward in response to decreasing load current, said second signal being in a direction to drive the rectifier output downward in response to increasing D.C. load current.

10. D.C. power supply apparatus comprising an input for receiving A.C., rectifier means connected to receive energy from said input, saturable reactor means connected to control the energy supplied to the rectifier means from the input, a D.C. load circuit for connecting the D.C. output of the rectifier means to a load, means for deriving a first signal responsive to the rate of change of the D.C. load current, means for obtaining a bias signal, means for deriving a third signal proportional to load current, means for controlling the impedance of said reactor means in response to said signals, the latter means including a network for electrically mixing said first signal with at least one of the other signals to obtain a resultant signal, said first signal being in a direction to drive the rectifier output upward in response to decreasing load current, said third signal being in a direction to drive the rectifier output downward in response to increasing load current.

11. D.C. power supply apparatus comprising an input for receiving A.C., rectifier means connected to receive energy from said input, saturable reactor means connected to control the energy supplied to the rectifier means from the input, a D.C. load circuit for connecting the D.C. output of the rectifier means to a load, means for deriving a first signal responsive to the rate of change of the D.C. load current, means for obtaining a second signal, means for deriving a third signal proportional to load current, a network for electrically mixing said signals to obtain a resultant signal, means for controlling the impedance of said reactor means in response to said resultant signal, said first signal being in a direction to drive the rectifier output upward in response to decreasing load current, said second signal being in a direction to drive the rectifier output upward in response to increase of that signal, said third signal being in a direction to drive the rectifier output downward in response to increasing load current.

12. D.C. welding apparatus comprising an input for receiving A.C., rectifier means connected to receive energy from said input, saturable reactor means connected to control the energy supplied to the rectifier means from the input, a D.C. load circuit for connecting the D.C. output of the rectifier means to a welding load, means for deriving a first signal responsive to the rate of change of the D.C. welding current, means for obtaining a second signal, means for deriving a third signal proportional to load current, means for controlling the impedance of said reactor means in response to said signals, the latter means including a network for electrically mixing said first signal with at least one of the other signals to obtain a resultant signal, said first signal being in a direction to drive the rectifier output upward in response to decreasing welding current, said second signal being in a direction to drive the rectifier output upward in response to increase of that signal, said third signal being in a direction to drive the rectifier output downward in response to increasing load current.

13. D.C. welding apparatus comprising an input for receiving A.C., rectifier means connected to receive energy from said input, saturable reactor means connected to control the energy supplied to the rectifier means from the input, a D.C. load circuit for connecting the D.C. output of the rectifier means to a welding load, means for deriving a first signal responsive to the rate of change of the D.C. welding current, means for obtaining a second signal, means for deriving a third signal proportional to load current, a network for electrically mixing said signals to obtain a resultant signal, means for controlling the impedance of said reactor means in response to said resultant signal, said first signal being in a direction to drive the rectifier output upward in response to decreasing welding current, said second signal being in a direction to drive the rectifier output upward in response to increase of that signal, said third signal being in a direction to drive the rectifier output downward in response to increasing load current.

14. A D.C. power supply apparatus comprising rectifier means having an input for receiving alternating current and a D.C. output, saturable reactor means for controlling the energy supplied to the rectifier, a load circuit for connecting said D.C. output to a D.C. load, rate signal means for obtaining a rate signal responsive to the rate of change of load current, control winding means for controlling the impedance of said reactor, feedback source means for obtaining a feedback signal proportional to changes in the load circuit, a source of bias signal, an impedance having end terminals and a tap intermediate the end terminals, and a circuit path including in series said control winding means and said rate signal means, one end of said path being connected to said tap, said feedback source means being connected between one of said end terminals and the other end of said path, the bias source being connected between the other end terminal and said other end of said path.

15. A D.C. power supply for an electric welder that comprises an input for receiving A.C., a source of D.C. that is connected to said input for A.C. to receive A.C. and that can convert said A.C. to D.C., a D.C. output circuit that is connected to said source of D.C. and that is connectable to a welding load to supply power to said welding load, and a rate transformer that has the primary winding thereof connected in said D.C. output circuit and that has the secondary winding thereof connected to said source of D.C., said source of D.C. having an impedance which is variable and which can be changed by a control signal from said secondary winding to vary the power that is supplied to said welding load by said D.C. output circuit, said welding load responding to rapid variations in the resistance of the electric arc to provide discrete swings in the direct current flowing through said D.C. output circuit and thus through said primary winding, said rate transformer responding to said discrete swings in the direct current flowing through said primary winding to produce discrete current swings in said secondary winding which correspond individually to said discrete swings in the direct current flowing through said primary winding and which have magnitudes individually proportional to the rates of change of said discrete swings in the direct current flowing through said primary winding, whereby said rate transformer produces in said secondary winding a variable signal that has discrete swings which correspond to and that have magnitudes proportional to the rates of change of said discrete swings in the direct current flowing through said primary winding, said secondary winding connecting said variable signal to said source of D.C. so said discrete swings of said variable signal cause said source of D.C. to vary its impedance in response to said discrete swings of said variable signal and thereby vary its impedance in accordance with said rates of change in the current in said D.C. output circuit, said variable signal from said secondary winding being connected to said source of D.C. so a change in the current in said D.C. output circuit that tends to decrease the level of said current in said D.C. output current will decrease the impedance of said source of D.C. and thereby tend to increase the level of said current in said D.C. output circuit.

16. A D.C. power supply comprising an input for receiving A.C., a source of D.C. that is connected to said input for A.C. to receive A.C. and that can convert said A.C. to D.C., a D.C. output circuit that is connected to said source of D.C. and that is connectable to a load to supply power to said load, and a rate transformer with a primary winding that has a multiplicity of turns, said primary winding being connected in said D.C. output circuit and the secondary winding of said rate transformer being connected to said source of D.C., said source of D.C. having an impedance which is variable and which can be changed by a control signal from said secondary winding to vary the power that is supplied to said load by said D.C. output circuit, said rate transformer responding to the rates of change in the direct current flowing through said primary winding to produce in said secondary winding a variable signal that corresponds to the rates of change of the direct current flowing through said primary winding, said secondary winding connecting said variable signal to said source of D.C. so said variable signal causes said source of D.C. to vary its impedance in response to said variable signal and thereby vary its impedance in accordance with said rates of change in the current in said D.C. output circuit, said variable signal from said secondary winding being connected to said source of D.C. so a change in the current in said D.C. output circuit that tends to decrease the level of said current in said D.C. output current will decrease the impedance of said source of D.C. and thereby tend to increase the level of said current in said D.C. output circuit.

17. A D.C. power supply for an electric welder that comprises an input for receiving A.C., a source of D.C. that is connected to said input for A.C. to receive A.C. and that can convert said A.C. to D.C., a D.C. output circuit that is connected to said source of D.C. and that is connectable to a welding load to supply power to said welding load, and a rate-detection device that is connected to said D.C. output circuit and that is also connected to said source of D.C., said source of D.C. having an impedance which is variable and which can be changed by a control signal from said rate-detection device to vary the power that is supplied to said welding load by said D.C. output circuit, said rate-detection device responding to swings of the direct current flowing in said D.C. output circuit to produce a variable signal that has swings which correspond individually to and that have magnitudes which are proportional to the rates of change of said swings in the direct current flowing in said D.C. output circuit, said rate-detection device being connected to said source of D.C. so said variable signal causes said source of D.C. to vary its impedance in response to said swings of said variable signal and thereby vary its impedance in accordance with said rates of change in the current in said D.C. output circuit, said variable signal from said rate detection device being connected to said source of D.C. so a change in the current in said D.C. output circuit that tends to decrease the level of said current in said D.C. output circuit will decrease the impedance of said source of D.C. and thereby tend to increase the level of said current in said D.C. output circuit.

18. A D.C. power supply for an electric welder that comprises an input for A.C., a saturable reactor connected to said input for A.C. to receive A.C., a rectifier that is connected to said saturable reactor and that receives power from said saturable reactor, a welding circuit connected to the D.C. output of said rectifier, and a rate transformer that has the primary winding thereof connected in said welding circuit and that has the secondary winding thereof connected to said saturable reactor, said primary winding having a multiplicity of turns to provide a substantial inductance, said rate transformer responding to the rates of change in the direct current flowing through the primary winding thereof to produce in said secondary winding a variable signal that corresponds individually to the rates of change of the direct current flowing through said primary winding, said secondary winding connecting said variable signal to said saturable reactor so said variable signal causes said saturable reactor to vary its impedance in response to said variable signal and thereby vary its impedance in accordance with said rates of change in the current in said welding circuit, said variable signal from said secondary winding being connected to said saturable reactor so a change in the current in said welding circuit that tends to increase the level of said current in said welding circuit will increase the impedance of said saturable reactor.

19. A D.C. power supply for an electric welder that comprises an input for receiving A.C., a source of D.C. that is connected to said input for A.C. to receive A.C. and that can convert said A.C. to D.C., a D.C. output circuit that is connected to said source of D.C. and that is connectable to a welding load to supply power to said welding load, and a rate-detection device that is connected to said D.C. output circuit and that is also connected to said source of D.C., said source of D.C. having an impedance which is variable and which can be changed by a control signal from said rate-detection device to vary the power that is supplied to said welding load by said D.C. output circuit, said rate-detection device responding to swings of the direct current flowing in said D.C. output circuit to produce a variable signal that has swings which correspond individually to and that have magnitudes which are proportional to the rates of change of said swings in the direct current flowing in said D.C. output circuit, said rate-detection device being connected to said source of D.C. so said variable signal causes said source of D.C. to vary its impedance in response to said swings of said variable signal and thereby vary its impedance in accordance with said rates of change in the current in said D.C. output circuit, said variable signal from said rate-detection device being connected to said source of D.C. so a change in the current in said D.C. output circuit that tends to decrease the level of said current in said D.C. output circuit will decrease the impedance of said source of D.C. and thereby tend to increase the level of said current in said D.C. output circuit, said rate detection device having a winding connected to said D.C. output circuit whereby said rate-detection device can sense rates of change of the current in said D.C. output circuit, said winding of said rate-detection device having a multiplicity of turns whereby said rate-detection device has a substantial inductance.

20. A D.C. power supply for an electric welder that comprises an input for receiving A.C., a source of D.C. that is connected to said input for A.C. to receive A.C. and that can convert said A.C. to D.C., a D.C. output circuit that is connected to said source of D.C. and that is connectable to a welding load to supply power to said welding load, and a rate-detection device that is connected to said D.C. output circuit and that is also connected to said source of D.C., said source of D.C. having an impedance which is variable and which can be changed by a control signal from said rate-detection device to vary the power that is supplied to said welding circuit by said D.C. output circuit, said rate-detection device responding to swings of the direct current flowing in said D.C. output circuit to produce a variable signal that has swings which correspond to and that are proportional to the rates of change of said swings in the direct current flowing in said D.C. output circuit, said rate-detection device being connected to said source of D.C. so said variable signal causes said source of D.C. to vary its impedance in response to said swings of said variable signal and thereby vary its impedance in accordance with said rates of change in the current in said D.C. output circuit, said variable signal from said rate-detection device being connected to said source of D.C. so a change in the current in said D.C. output circuit that tends to decrease the level of said current in said D.C. output circuit will decrease the impedance of said source of D.C. and thereby tend to increase the level of said current in said D.C. output circuit, said rate-detection device being saturable and being adapted to saturate, and thereby pass current peaks, at all welding current values above a predetermined value lying within the welding current operating range of the apparatus.

References Cited in the file of this patent

UNITED STATES PATENTS

| | | |
|---|---|---|
| 2,078,880 | Logan | Apr. 27, 1937 |
| 2,723,372 | Eagan et al. | Nov. 8, 1955 |
| 2,765,374 | Louden | Oct. 2, 1956 |
| 2,765,436 | Dornhoefer | Oct. 2, 1956 |
| 2,790,127 | Hamilton | Apr. 23, 1957 |
| 2,798,571 | Schaelchlin | July 9, 1957 |